United States Patent [19]

Naitoh et al.

[11] 4,391,421
[45] Jul. 5, 1983

[54] RETRACTOR FOR SEAT BELT WITH AN ALLEVIATING DEVICE

[75] Inventors: Katsumi Naitoh; Hideo Yanagihara, both of Fujisawa, Japan

[73] Assignee: NSK-Warner K. K., Tokyo, Japan

[21] Appl. No.: 242,535

[22] Filed: Mar. 11, 1981

[30] Foreign Application Priority Data

Mar. 21, 1980 [JP] Japan .................... 55/35772[U]

[51] Int. Cl.³ .................. A62B 35/00; B65H 75/48
[52] U.S. Cl. .................................................. 242/107.7
[58] Field of Search ............ 242/107.7, 107.6, 107.12; 280/806–808; 297/475–478

[56] References Cited

U.S. PATENT DOCUMENTS

| | | | |
|---|---|---|---|
| 1,674,512 | 6/1928 | Hessian | 242/107.7 X |
| 4,002,311 | 1/1977 | Fisher et al. | 242/107.7 |
| 4,106,722 | 8/1978 | Inukai et al. | 242/107.7 |
| 4,108,395 | 8/1978 | Heath | 242/107.7 |
| 4,124,175 | 11/1978 | Cislak | 242/107.7 |
| 4,149,683 | 4/1979 | Fisher et al. | 242/107.7 |
| 4,165,054 | 8/1979 | Collins | 242/107.7 |
| 4,172,568 | 10/1979 | Yamanashi et al. | 242/107.6 |
| 4,198,011 | 4/1980 | Kamijo et al. | 242/107.7 |
| 4,199,172 | 4/1980 | Fukunaga et al. | 280/807 |
| 4,270,709 | 6/1981 | Inukai | 242/107.7 |
| 4,295,684 | 10/1981 | Naitoh | 242/107.6 X |

FOREIGN PATENT DOCUMENTS 54-102719 8/1979 Japan .................... 242/107.6

Primary Examiner—John M. Jillions
Attorney, Agent, or Firm—Shapiro and Shapiro

[57] ABSTRACT

A retractor for seat belt with an alleviating device has a webbing take-up shaft biased in webbing take-up direction and rotatably supported on a base, a gear train comprising a first gear member mounted on the take-up shaft for rotation therewith and a second gear member mesh-engaging the first gear member and rotatably provided on the base, a disc with a cam portion provided for rotation with the second gear member by friction engagement therebetween, and a latch member movable between an engaged position in which it is engaged with a portion integral with the gear train and prevents the rotation of the take-up shaft in the webbing take-up direction and a disengaged position in which it is not engaged with the portion integral with the gear train. The latch member is biased toward the engaged position, and the disc with a cam portion has a first guide portion for guiding the latch member from the engaged position to the disengaged position upon draw-out of webbing, a second guide portion for guiding the latch member to the disengaged position upon take-up of the webbing and for holding the latch member in the disengaged position, and a third guide portion for guiding the latch member held in the second guide portion to the engaged position upon draw-out of the webbing.

6 Claims, 8 Drawing Figures

RETRACTOR FOR SEAT BELT WITH AN ALLEVIATING DEVICE

BACKGROUND OF THE INVENTION

1. Field of the Invention

This invention relates to a retractor for a seat belt with a device for alleviating webbing take-up force, i.e., tension, during the wearing of the belt, and more particularly to a retractor a seat belt with a take-up force alleviating device having a detent mechanism and a disc with a cam portion.

2. Description of the Prior Art

There have heretofore been proposed various retractors of this type, but many of them have room for improvement in the range in which the belt wearer can act during the wearing of the belt and the ease with which operations for wearing and releasing the belt is effected.

SUMMARY OF THE INVENTION

It is therefore an object of the present invention to provide a retractor for a seat belt provided with a take-up force alleviating device which permits a wide range in which the belt wearer can act and which may be used with excellent operability.

The invention will become fully apparent from the following detailed description thereof taken in conjunction with the accompanying drawings.

DESCRIPTION OF THE PREFERRED EMBODIMENT

An embodiment of the present invention will hereinafter be described with reference to the drawings.

Figure 1:
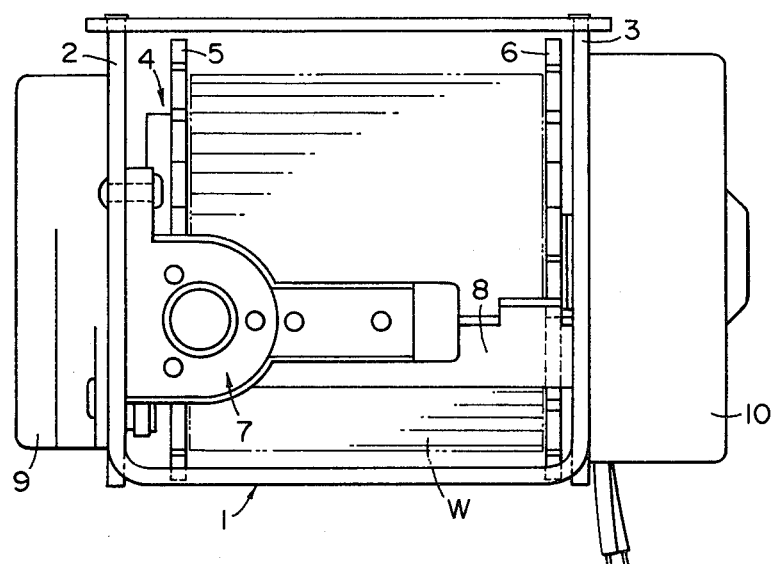
FIG. 1 is a bottom view of an embodiment of the present invention.

Referring to FIG. 1, a shaft assembly 4 biased in webbing take-up direction is rotatably supported between the opposite side plates 2 and 3 of a base 1. The shaft assembly 4 has on the opposite ends thereof ratchet wheels 5 and 6 which also serve as flanges for taking up webbing W on the shaft assembly 4. These ratchet wheels 5 and 6 may during an emergency mesh with a brake 8 actuated by a vehicle acceleration sensing device 7 mounted on the inside of the side plate 2, thereby locking the rotation of the shaft assembly 4 in webbing draw-out direction.

Secured to the outside of the side plate 2 is a cover 9 containing therein a webbing sensing device (not shown) for sensing high speed or acceleration draw-out of the webbing W during an emergency and locking the rotation of the shaft assembly 4 in webbing draw-out direction.

That is, the present embodiment is a so-called dual type emergency locking retractor. However, this in only illustrative, so the take-up force alleviating device of the present embodiment within a cover 10 secured to the outside of the side plate 3 which will fully be described hereinafter is applicable to various types of emergency locking retractors.

Portions of the take-up force alleviating device will now be described by reference to FIG. 2 and FIG. 3.

A pinion 12 constituting a first gear member is provided on one end of a shaft 11 of the shaft assembly 4 for rotation therewith, and a tracer latch member 13 and a link arm 14 are pivotally mounted further toward the end of the shaft 11. A torsion coil spring 15 is extended between these two members 13 and 14, and a spring pin 16 secured to the tracer latch member 13 extends into the slot 14a of the link arm 14.

A hollow second gear member 20 formed on the outer periphery thereof with a larger gear portion 18 meshing with the pinion 12 and a ratchet gear portion 19 for meshing with the pawl portion 13a of the tracer latch member 13 is rotatably mounted on a shaft 17 secured to the side plate 3 in parallelism to the shaft 11. A take-up spring 21 having the inner end thereof fixed to the shaft 17 and the outer end thereof fixed to a slit 20a formed in the inner wall of member 20 is contained in member 20, and the shaft assembly 4 is thereby biased in webbing take-up direction.

The inner surface of the take-up spring 21 is not in direct contact with the side plate 3, but in contact with a lower plate 22 fitted to the shaft 17.

The take-up spring 21 need not always be provided at the shown position, but for example, in a device wherein a webbing sensing mechanism is not provided in the cover 9 shown in FIG. 1, the take-up spring 21 may be provided there.

A disc 23 with a cam portion rotatably fitted on the shaft 17 is disposed on the upper surface of the box 20, and this is biased against the upper surface by a wave washer 26 pushed toward the disc 23 by a snap ring 24 and a flat washer 25 mounted on the outer end of the shaft 17. Consequently, the member 20 and the disc 23 are in frictional engagement with each other.

The disc 23 with a cam portion has a first cam groove 27, a second cam groove 28 and a third cam groove 29 for guiding the tracer terminal 13b of the tracer latch member 13. The first cam groove 27 extends counter-clockwisely in a vortex form by 1¼ turns as viewed in FIG. 2 so as to lead the pawl portion 13a of the latch member 13 from a position in which it is engaged with the ratchet gear portion 19 to a position in which it is not engaged with the ratchet gear portion 19, the second cam groove 28 is turned back from the terminal end of the first cam groove 27 and extends to a point somewhat beyond the starting end of the first cam groove 27 so as to lead the pawl portion 13a to a position short of the engaged position while maintaining it in non-engaged state and hold the same there, and the third cam groove 29 extends from the terminal end of the second cam groove 28 to the starting end of the first cam groove 27 so as to lead the pawl portion 13a from the above-described position short of the engaged position to the engaged position.

Description will now be made of a releasing device including the link arm 14.

A solenoid assembly 30 is secured to the side plate 3, and it has a plunger 32 biased outwardly thereof by a coil spring 31. A spring pin 33 is attached to the outer end of the plunger 32, and this pin 33 extends into a slot 14b formed in the outer end of the link arm 14. Accordingly, when the solenoid assembly 30 is energized to attract the plunger 32, for example, by the slide button of the buckle of the seat belt being pushed for releasing the belt, the link arm 14 is pivoted in clockwise direction as viewed in FIG. 2 and along therewith, the tracer latch member 13 is also pivoted in a clockwise direction through the secured spring pin 16. In a condition wherein the plunger 32 is not attracted, the tracer latch member 13 is movable relative to the link arm 14 from its engaged position to its non-engaged position against the biasing force of the torsion coil spring 15 and is movable in the opposite direction by the biasing force of the coil spring 15.

The operation of the present embodiment having the above-described construction will now be described with reference to FIGS. 4 to 7.

Figure 4:
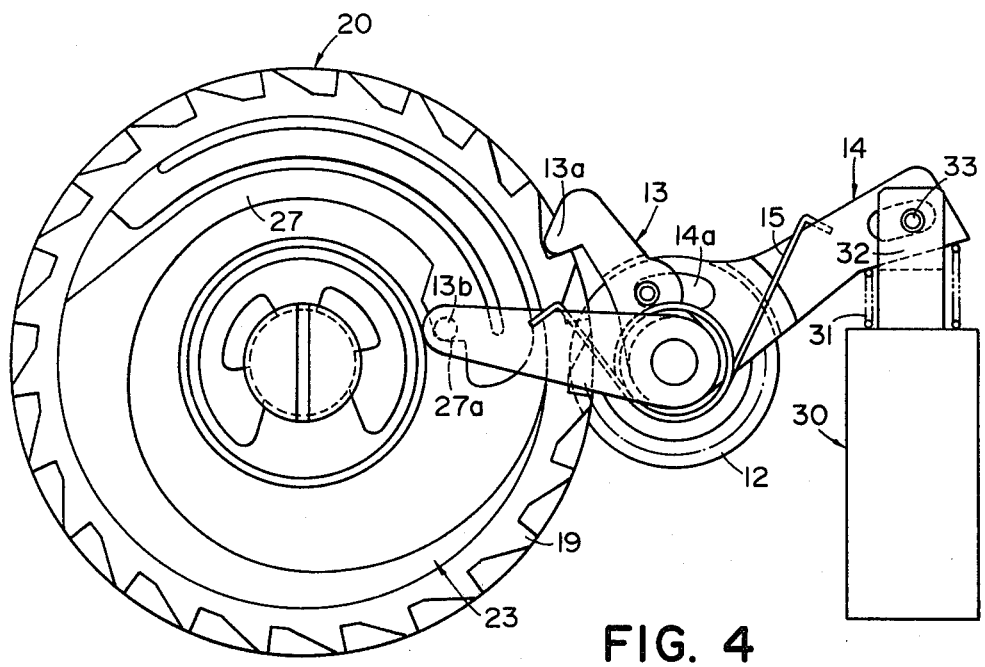
FIGS. 4 through 7 illustrate the operation of the embodiment.
Figure 5:
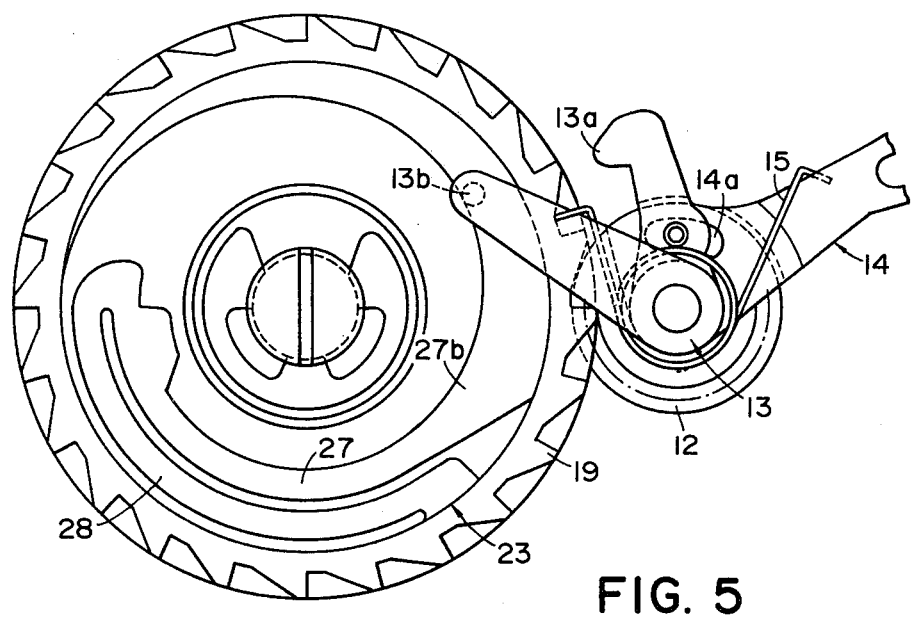

FIG. 4 shows a condition in which the belt is worn with the take-up force alleviated. At this time, the tracer terminal 13b is received in the restraining groove portion 27a of the first cam groove 27 and the pawl portion 13a is in mesh-engagement with the ratchet gear portion 19. Therefore, member 20 cannot rotate counter-clockwisely and accordingly, the rotation of the shaft assembly 4 in take-up direction is locked. Thus, the take-up spring force is not applied to the belt wearer to permit comfortable wearing of the belt.

However, the member 20 is rotatable in a clockwise direction. When the webbing W is drawn out and the box 20 and the disc 23 are rotated clockwisely, the tracer terminal 13b rides onto the non-restraining groove portion 27b of the first cam groove 27 and the tracer latch member 13 moves against the force of the torsion coil spring 15. Thus, the pawl portion 13a becomes disengaged from the ratchet gear portion 19, so that the take-up spring force is restored. At this time, the link arm 14 remains stationary. Consequently, if the draw-out force is eliminated, the webbing will again be taken up and the condition of FIG. 4 will be restored and the take-up force will be eliminated. This is the range in which the belt wearer can act during the wearing of the belt. This range extends to immediately before the tracer terminal 13b comes into the second cam groove 28, and in the case of the present embodiment, if the ratio of the number of teeth of the pinion 12 to that of the large gear portion 18 is 1:3, the 3¾ rotations of the shaft assembly 4 provides the range in which the belt wearer can act, because the first cam groove 27 has made about 1¼ rotations.

Figure 6:
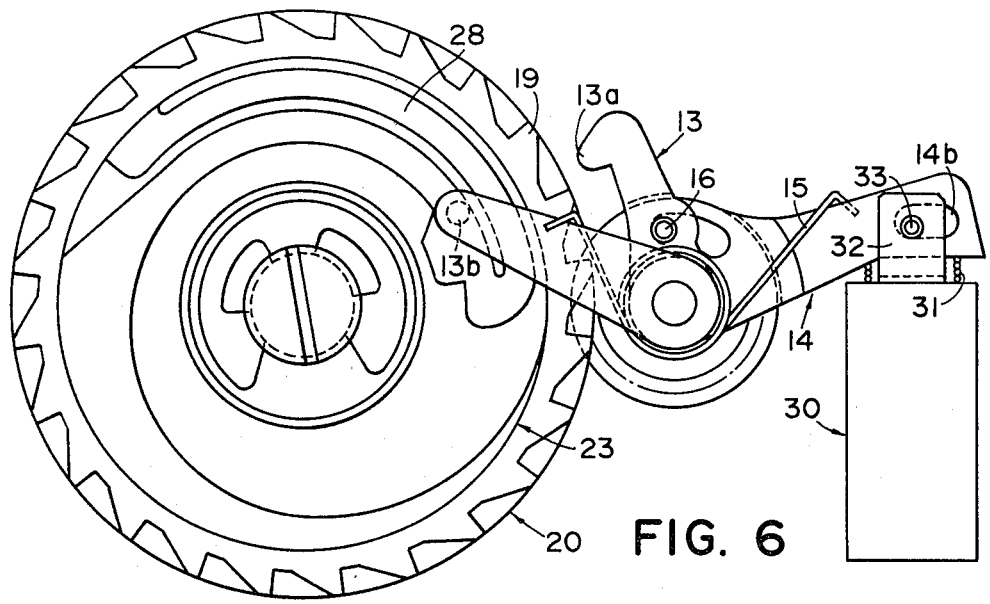

If, it is desired to release the belt the slide button of the buckle may be depressed. Thereby, as shown in FIG. 6, the link arm 14 rocks clockwise with the tracer latch member 13 and the pawl portion 13a becomes disengaged from the ratchet gear portion 19. Thus, the take-up spring force is restored. Consequently, the shaft assembly 4 rotates clockwise while the member 20 and the disc 23 rotate counterclockwisely, and the shaft assembly 4 and the members 20 continue to rotate with the tracer terminal 13b held in the second cam groove 28 as shown in FIG. 2, thereby taking up the whole amount of webbing W. At this time, the disc 23 is at first rotated with the member 20 by the friction engagement thereof with member 20, but immediately the disc 23 is stopped by the tracer terminal 13b bearing against the wall of the disc 23 in its held position in the second cam groove 28. While the disc 23 is thus stopped, there is a friction between the member 20 and the disc 23.

Figure 7:
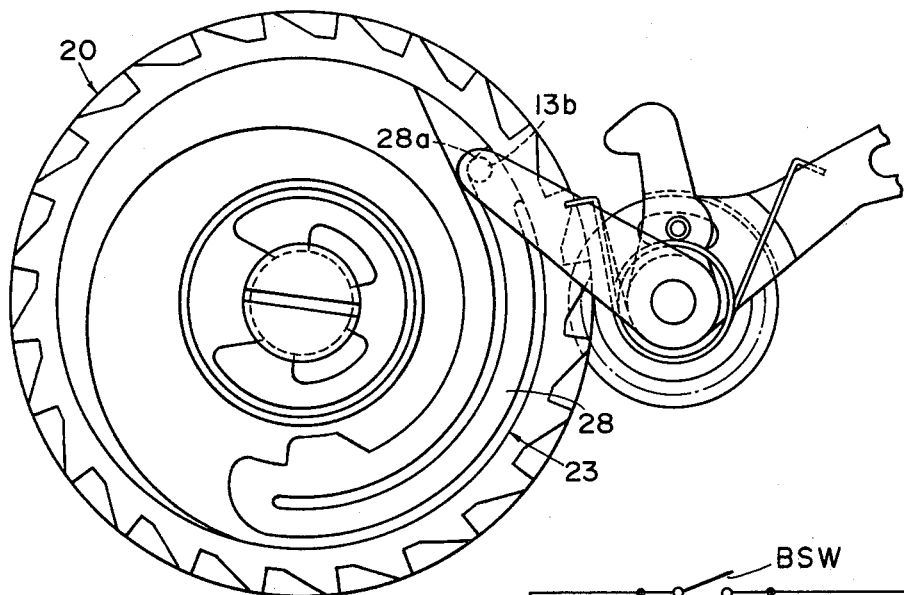

Description will now be made of a case where the webbing W is drawn out from the stand-by condition of FIG. 2 and the belt is worn. When the webbing W is drawn out, the disc 23 with a cam portion is rotated with the member 20 by the frictional engagement thereof with the box 20 until the tracer terminal 13b comes to bear against the turned-back starting end 28a as shown in FIG. 7 via the condition of FIG. 5, whereafter the disc 23 remains in this position, while only the shaft assembly 4 and the member 20 rotate counterclockwise and clockwise, respectively. Just after the buckle is brought into mesh engagement with a tongue to which is attached the webbing W which has been drawn out by an appropriate amount, the webbing W is taken up by an excessive amount until it fits to the belt wearer and along therewith, the box 20 and the disc 23 rotate counter-clockwise. Thus, the condition of FIG. 2 is restored from the condition of FIG. 7. Accordingly, if the webbing W is drawn out by some amount at this point, the tracer terminal 13b will follow the third cam groove 29 and drop into the restraining groove portion 27a of the first cam groove 27, whereby the belt-worn condition of FIG. 4 in which appropriate slack has been set up will be realized.

Now, during the belt wearing of FIG. 4, once the webbing W is drawn out until the tracer terminal 13b drops into the second cam groove 28, the condition of FIG. 4 will not directly be restored, and in order that the condition of FIG. 4 may be restored, it is necessary to once rewind the webbing W by a suitable amount and then draw out the webbing by some amount, thereby re-setting the webbing.

As a method of taking up the whole amount of webbing W from the belt-worn condition, there are the following methods in addition to the one already described.

Figure 2:
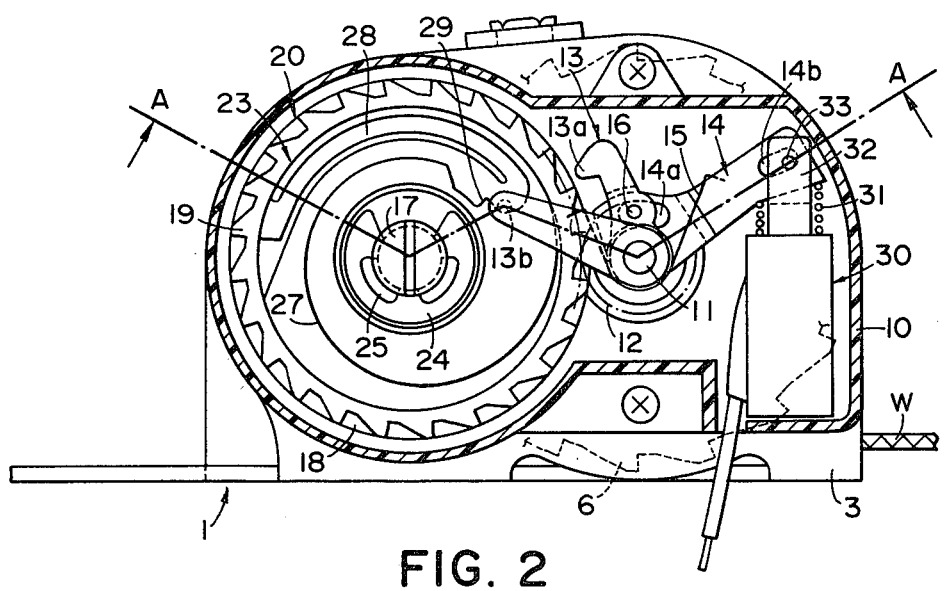
FIG. 2 is a front view of a part of this embodiment.
Figure 3:
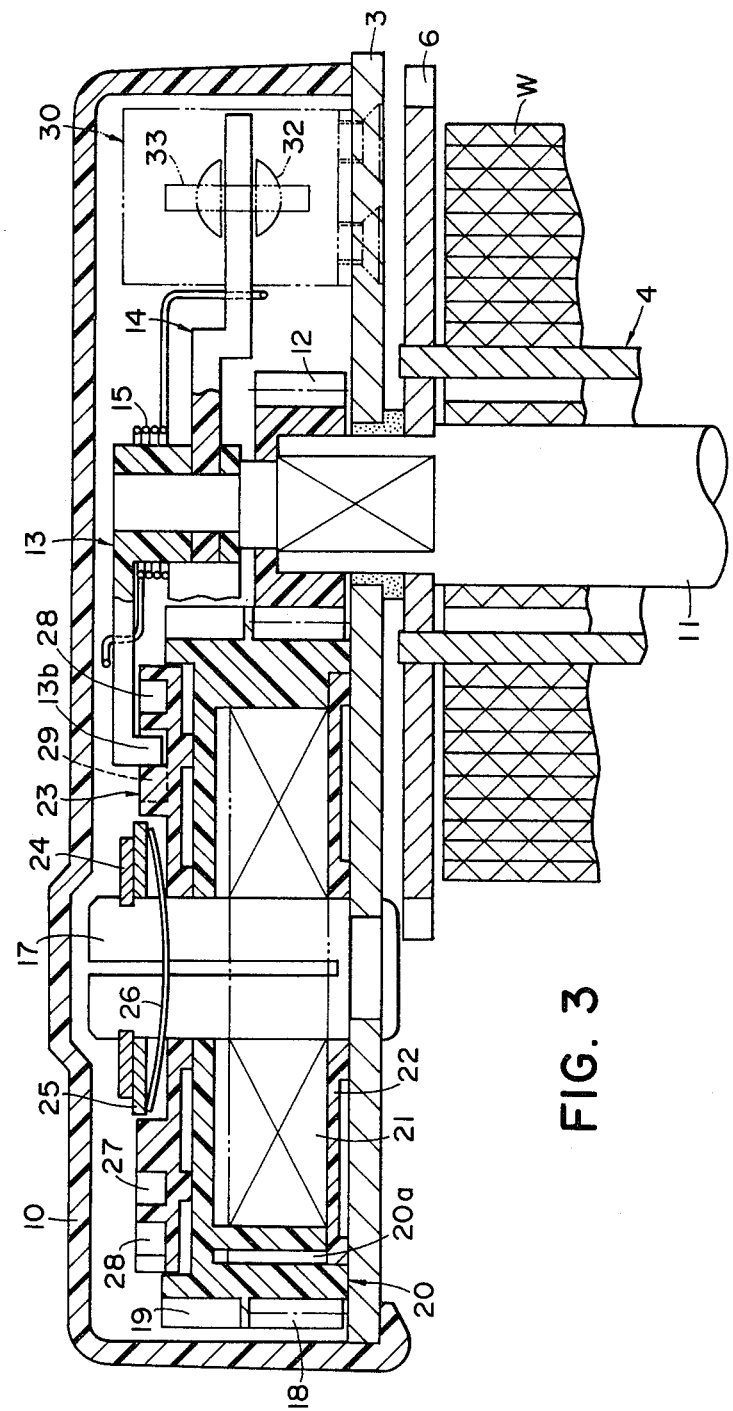
FIG. 3 is a cross-sectional view taken along line A—A of FIG. 2.

Firstly, where there is no releasing means, if the webbing is drawn out from the belt-worn condition beyond the above-described range in which the belt wearer can act, the stand-by condition of FIG. 2 will necessarily be brought about and the whole amount of webbing will be taken up.

Secondly, where the aforementioned link arm can be extended into the vehicle compartment to be manually operable, this may be tilted down to realize the unlocked condition. In this case, the link arm must be formed into an automatically returnable construction.

Thirdly, it is also possible to operate a member such as the aforementioned link arm by utilizing the opening-closing operation of the door.

Fourthly, a method is also possible in which the sliding movement of the buckle button is transmitted to the aforementioned link arm, through mechanical means, for example, push-pull wire.

Figure 8:
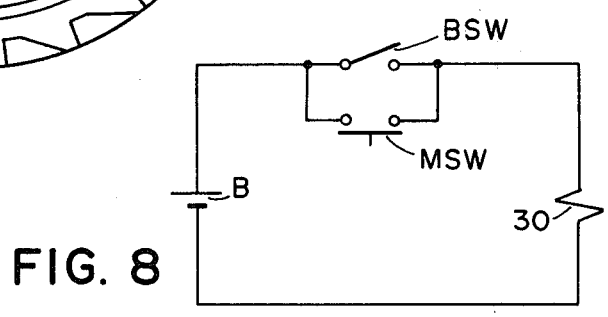
FIG. 8 is a circuit diagram including a buckle switch and a manual switch.

Further, as shown in FIG. 8, a buckle switch BSW and a manual switch MSW performing the above-described functions may be added in parallel to the circuit of a battery B and solenoid assembly 30. This is for coping with a situation in which when the vehicle is running up or down along a steep slope under the tension-alleviated condition of FIG. 4, the vehicle acceleration sensing device works to lock the rotation of the reel in both the webbing draw-out and take-up directions. In such case, the solenoid assembly 30 is energized by the operation of the manual switch MSW provided in the dashboard or in the console box to release the tension lock, thus enabling the webbing to be wound up.

While, in the above-described embodiment, the pawl portion of the tracer latch member engages a portion integral with the large gear, design may be made such that it engages a portion integral with the pinion.

According to the present invention, as has been described above, the range in which the belt wearer can act can be increased and the operability is improved.

What we claim is:

1. A retractor for a seat belt which is provided with a tension alleviating device, comprising a webbing take-up shaft biased in webbing take-up direction and rotatably supported on a base, a gear train consisting of a first gear member mounted on said take-up shaft for rotation therewith and a second gear member meshing with said first gear member and rotatably provided on said base, the second gear member having a greater number of teeth than the first gear member, a disc with a cam portion provided for rotation with said second gear member by frictional engagement therebetween, and a latch member movable between an engaged position in which it is engaged with a portion integral with said gear train and prevents rotation of said take-up shaft in the webbing take-up direction and a non-engaged position in which it is disengaged from said portion integral with said gear train, said latch member being biased toward said engaged position, said disc with a cam portion having a generally circumferentially extending first guide portion for guiding said latch member from said engaged position to said disengaged position upon draw-out of webbing, a second guide portion for guiding said latch member to said disengaged position short of said engaged position upon take-up of the webbing with said latch member remaining disengaged from said portion integral with said gear train and for holding said latch member in said disengaged position, said second guide portion being turned back from a terminal end of said first guide portion and extending generally circumferentially beyond a starting end of said first guide portion, and a third guide portion for guiding said latch member held in said second guide portion to said engaged position upon draw-out of the webbing, said third guide portion extending from the terminal end of said second guide portion to the starting end of said first guide portion.

2. A retractor according to claim 1, wherein said take-up shaft is biased in webbing take-up direction by the biasing force of bias means attached to said second gear member, through said gear train.

3. A retractor according to claim 1, wherein said portion integral with said gear train is an external ratchet wheel integral with said second gear member.

4. A retractor according to claim 1, further having releasing means for moving said latch member in said engaged position to said disengaged position against the biasing force independently of the rotation of said disc with a cam portion at a desired time.

5. A retractor according to claim 4, wherein said releasing means includes a solenoid assembly which operates said latch member through an arm member.

6. A retractor according to claim 1, wherein said latch member has a tracer portion adapted to pursue along the guide portion of said disc with a cam portion, and a latch portion for engaging said portion integral with said gear train.

* * * * *